(12) United States Patent
Fujiwara et al.

(10) Patent No.: US 8,241,785 B2
(45) Date of Patent: Aug. 14, 2012

(54) ALKALINE DRY BATTERY AND BATTERY PACK

(75) Inventors: Michiko Fujiwara, Osaka (JP); Seiji Wada, Osaka (JP); Yasushi Sumihiro, Hyogo (JP)

(73) Assignee: Panasonic Corporation, Osaka (JP)

( * ) Notice: Subject to any disclaimer, the term of this patent is extended or adjusted under 35 U.S.C. 154(b) by 961 days.

(21) Appl. No.: 12/061,468

(22) Filed: Apr. 2, 2008

(65) Prior Publication Data

US 2009/0035650 A1 Feb. 5, 2009

(30) Foreign Application Priority Data

Aug. 2, 2007 (JP) .................. 2007-202080

(51) Int. Cl.
 *H01M 6/42* (2006.01)
 *H01M 2/02* (2006.01)
 *H01M 2/08* (2006.01)
 *H01M 6/04* (2006.01)
 *H01M 10/26* (2006.01)

(52) U.S. Cl. ........ 429/184; 429/149; 429/181; 429/185; 429/206

(58) Field of Classification Search .............. 429/149, 429/181, 184, 185, 206
See application file for complete search history.

(56) References Cited

U.S. PATENT DOCUMENTS

| 4,401,733 | A | * | 8/1983 | Shirai et al. | 429/174 |
| 5,034,290 | A | * | 7/1991 | Sands et al. | 429/120 |
| 6,183,899 | B1 | * | 2/2001 | Sanchez et al. | 429/53 |
| 2003/0219650 | A1 | * | 11/2003 | Saruwatari et al. | 429/218.1 |
| 2005/0031951 | A1 | | 2/2005 | Mushiga et al. | |
| 2005/0064284 | A1 | * | 3/2005 | Sumiyama et al. | 429/174 |
| 2005/0271942 | A1 | * | 12/2005 | Izumi et al. | 429/223 |
| 2006/0003222 | A1 | * | 1/2006 | Mushiga et al. | 429/180 |

FOREIGN PATENT DOCUMENTS

| EP | 1 681 736 A1 | 7/2006 |
| JP | 54-11442 | 1/1979 |
| JP | 57-065668 | 4/1982 |
| JP | 57-072259 A | 5/1982 |
| JP | 58-019856 A | 2/1983 |
| JP | 62-126545 | 6/1987 |
| JP | 05-290820 | 11/1993 |
| JP | 2005-056742 A | 3/2005 |
| JP | 2005-353308 | 12/2005 |
| JP | 2007-026924 | 2/2007 |

OTHER PUBLICATIONS

Hull, Michael N. et al, "Why Alkaline Cells Leak," Electrochemical Science and Technology, vol. 124, No. 3, Mar. 1977, pp. 332-339.

(Continued)

*Primary Examiner* — Gregg Cantelmo
*Assistant Examiner* — Eugenia Wang
(74) *Attorney, Agent, or Firm* — McDermott Will & Emery LLP

(57) ABSTRACT

In an alkaline dry battery, an opening portion of a positive electrode case is sealed by a terminal plate serving as a negative electrode terminal via an insulating sealing body, and a sealant layer is provided between the positive electrode case and the sealing body. The sealant layer is made of a material having a tensile strength of 0.02 $N/mm^2$ or more with respect to a tensile distortion of 5 mm. For example, the sealant layer is made of a material containing, as a major component, polyamide resin having an amine number in a range of 50-200.

8 Claims, 5 Drawing Sheets

OTHER PUBLICATIONS

Japanese Notice of Reasons for Rejection, w/ English translation thereof, issued in Japanese Patent Application No. JP 2007-202080 dated Oct. 13, 2009.

Extended European Search Report, issued in European Patent Application No. 08 152 884.6, dated Sep. 21, 2011.

* cited by examiner

FIG. 1A
FIG. 1B
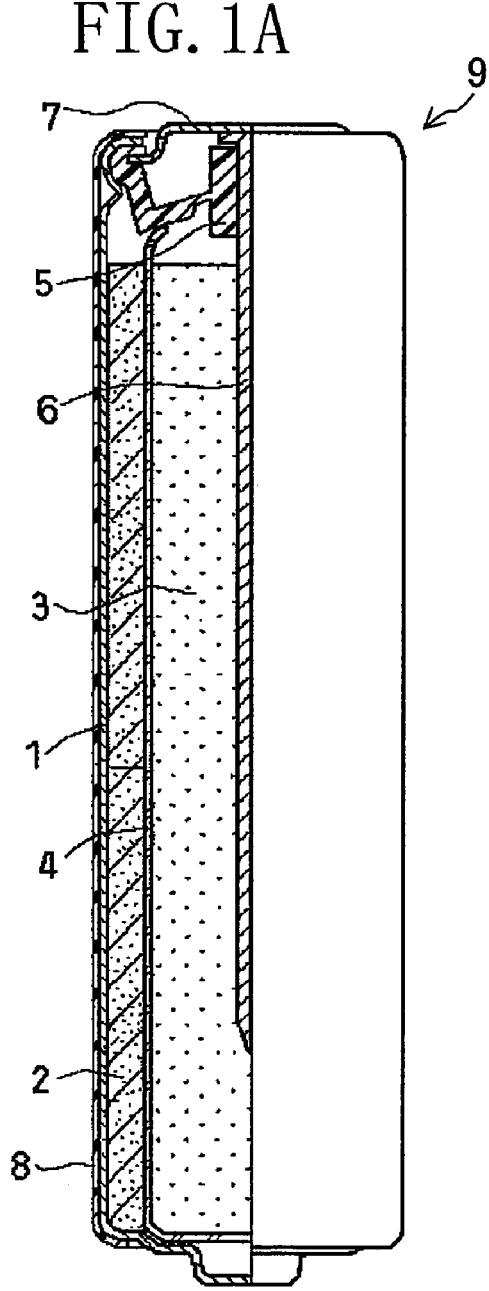
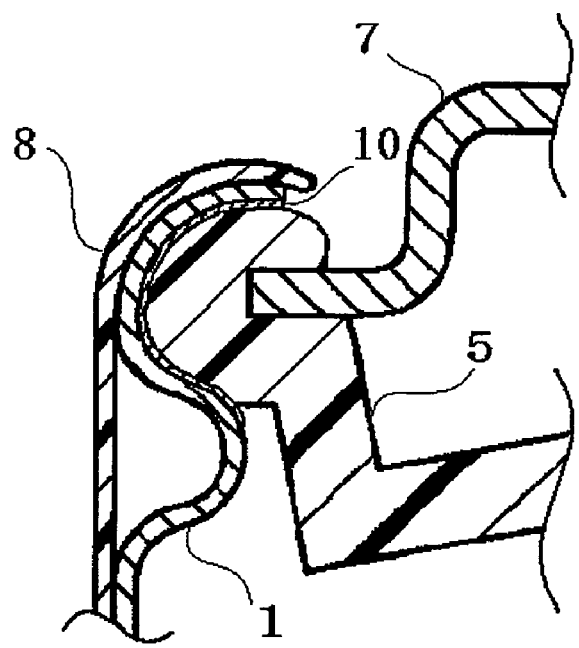

FIG. 3A
FIG. 3B
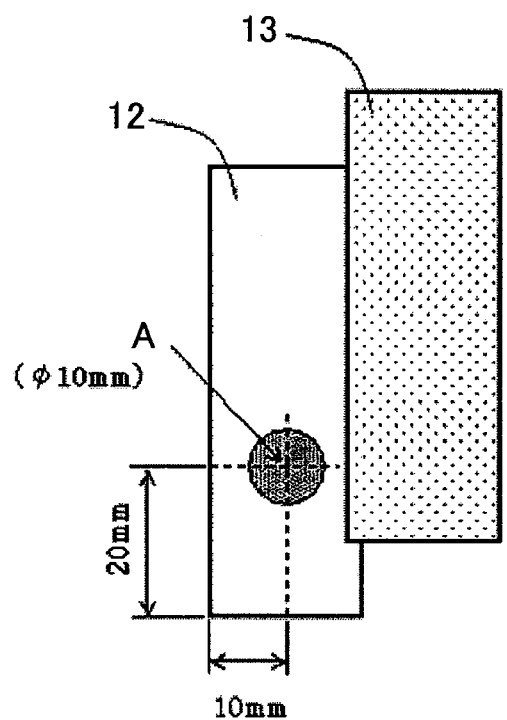
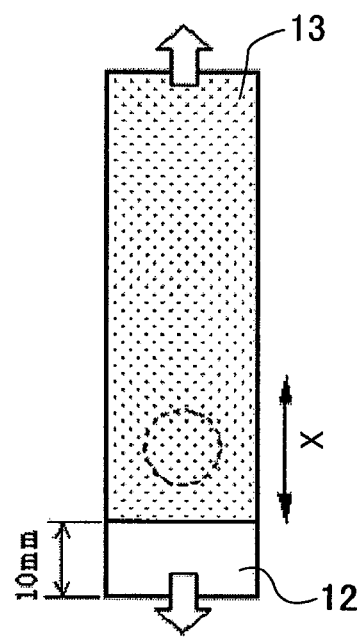

ALKALINE DRY BATTERY AND BATTERY PACK

BACKGROUND OF THE INVENTION

1. Field of the Invention

The present invention relates to a sealant layer applied between a positive electrode case and a sealing body of an alkaline dry battery.

2. Description of the Prior Art

A positive electrode case of an alkaline dry battery is a sealed case obtained by sealing an opening portion thereof with a terminal plate serving as a negative electrode terminal via an insulating sealing body. Conventionally, in order to improve the leakage proof property in such an alkaline dry battery, there have been configurations in which a sealant layer is provided between a positive electrode case and a sealing body.

An insulating material with a high viscosity is normally used for a sealant layer. However, there still have been studies on materials which can prevent degradation of the leakage proof property under various use environments.

For example, a material (such as a mixture of polyisobutylene, polybutene and polyolefin crystalline resin) having a high viscosity even in a high temperature range is described as a sealant layer of which a leakage proof property is not degraded with respect to a temperature cycle in Japanese Laid-Open Publication No. 5-290820.

Moreover, there are cases where a material obtained by adding nickel oxyhydroxide to manganese dioxide is used as a positive electrode mixture in order to improve the current discharge property. However, since nickel oxyhydroxide is highly oxidative, the sealant layer provided between the positive electrode case to which a positive potential is applied and the sealing body is easily degraded through oxidation. As a sealant layer suitable in such a case, a material (such as a mixture of blown asphalt and polybutene) having an excellent oxidation proof property is described in Japanese Laid-Open Publication No. 2005-353308.

There are also cases where a sealant layer is provided between a negative electrode current collector connected to a terminal plate and a sealing body in order to improve a leakage proof property of an alkaline dry battery. In such a case, if a material used as a sealant layer has a water absorbing property, a sufficient leakage proof property might not be able to be achieved under a humid condition. A possible reason for this is as follows. If moisture exists in a sealing portion between a negative electrode current collector to which a negative potential is applied and a sealing body, a reaction expressed by $H_2O+e^- \rightarrow OH^- + \frac{1}{2}H_2$ occurs in the sealing portion, so that cations such as $K^+$ ions in an alkaline electrolyte move and a creep phenomenon is easily caused. As a sealant layer suitable for such a case, a material (such as a mixture of polyamide resin and synthesized oil) having an excellent repellency is described in Japanese Laid-Open Publication No. 2007-26924.

As another sealant layer, for example, a material (such as a mixture of epoxy resin and polyamide resin) having a high sealing property at a high temperature is described in Japanese Laid-Open Publication No. 57-065668 and a material (such as polyamide resin of which a softening point is within a temperature range from 40° C. to 60° C.) with a high ductility is described in Japanese Laid-Open Publication No. 62-126545.

SUMMARY OF THE INVENTION

As has been described, for a known sealant layer, materials of which a leakage proof property is not degraded under various use environments have been examined. Also, there is a demand to ensure the leakage proof property in the case where a sealing portion of a battery is deformed when the battery is impacted by dropping or the like. That is, a sealant layer is required to have a sufficient tensile strength so as to be deformed according to a deformation (typically, about 0.5 mm) of sealing portion due to an impact.

In the market, by the way, alkaline batteries are normally distributed in the form of battery packs (multi-packs) of a plurality of alkaline batteries (for example, 8, 12 or 20 batteries) packaged (specifically, shrink-packaged) with a heat-shrinkable film or the like. If a battery pack packaged in such a packaging manner is accidentally dropped when being transported, unpacked, displayed or the like, the battery package as a whole has an increased weight and thus a larger impact is applied to batteries. Particularly, since batteries are in close contact with each other in the shrink-packaged battery package, a larger impact is applied to each alkaline dry battery therein, compared to the case where alkaline batteries are separately dropped and therefore leakage might be caused. Moreover, in such an eventuality, if leakage occurs in an alkaline dry battery in the battery package, contamination might be expanded to other alkaline batteries in close contact with the alkaline dry battery. However, conventionally, careful consideration has hardly given to the leakage proof property with respect to a deformation of a sealing portion in a battery package packaged in the above-described manner when the battery is impacted by dropping or the like.

In view of the above-described problems, the present invention has been devised and it is therefore an object to provide an alkaline dry battery in which leakage due to a deformation of a battery sealing portion is prevented when the battery is impacted by dropping or the like and which exhibits an excellent impact proof property.

An alkaline dry battery according to the present invention is an alkaline dry battery in which an opening portion of a positive electrode case is sealed by a terminal plate serving as a negative electrode terminal via an insulating sealing body and is characterized by including: a sealant layer provided between the positive electrode case and the sealing body and in that the sealant layer is made of a material having a tensile strength of 0.02 N/mm² or more with respect to a tensile distortion of 5 mm.

In one preferred embodiment of the present invention, the sealant layer is made of a material containing polyamide resin as a major component. Moreover, it is preferable that the polyamide resin has an amine number in a range from 50 to 200, and more preferably in a range from 75 to 147.

A battery pack according to the present invention is characterized by including a plurality of alkaline dry batteries of the above-described type which are shrink-packaged by a heat-shrinkable film. The battery pack may be a blister pack or a paper pack including the plurality of alkaline dry batteries.

According to the present invention, even when the sealing portion of the battery is deformed due to an impact, the sealant layer provided between the positive electrode case and the sealing body can be deformed, according to the deformation, with its viscous property maintained, thereby ensuring the sealing property between the positive electrode case and the sealing portion. Thus, an alkaline dry battery with an excellent impact proof property, in which leakage does not occur even when the battery pack in which batteries are shrink-packaged is dropped or the like and a large impact is given to the sealing portion of any one of the batteries to cause a deformation of the battery, can be achieved.

BRIEF DESCRIPTION OF THE DRAWINGS

FIG. 1A is a half sectional view schematically illustrating a configuration of an AA alkaline dry battery according to an embodiment of the present invention; and FIG. 1B is an enlarged cross-sectional view of a battery sealing portion therein.

FIG. 2A is a view illustrating a configuration of a battery pack in which 8 alkaline batteries are shrink-packaged; and FIG. 2B is a view illustrating a configuration of a battery pack in which 12 alkaline batteries are shrink-packaged.

FIGS. 3A and 3B are views illustrating how a shear tensile strength is measured according to an embodiment of the present invention.

DESCRIPTION OF THE PREFERRED EMBODIMENTS

Figure 2A:
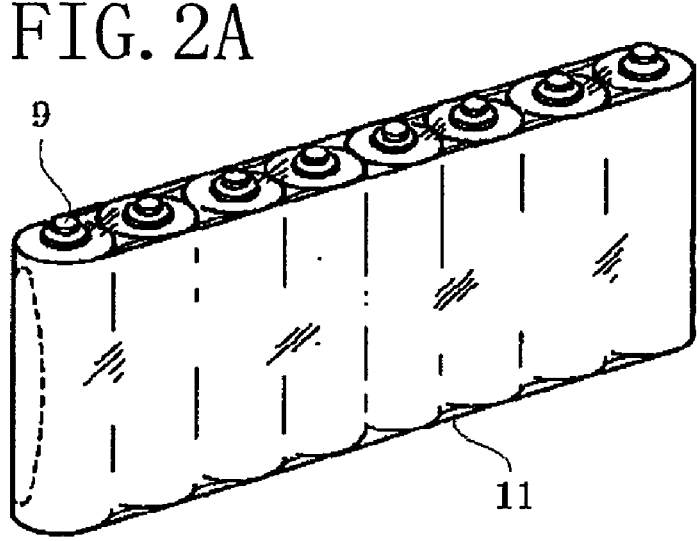
FIGS. 2A and 2B are views illustrating configurations of battery packs according to an embodiment of the present invention.

Hereafter, embodiments of the present invention will be described with reference to the accompanying drawings. In the drawings, components having substantially the same function are denoted by the same reference numeral for the purpose of simplicity. Note that the present invention is not limited to the following embodiments.

Figure 2B:
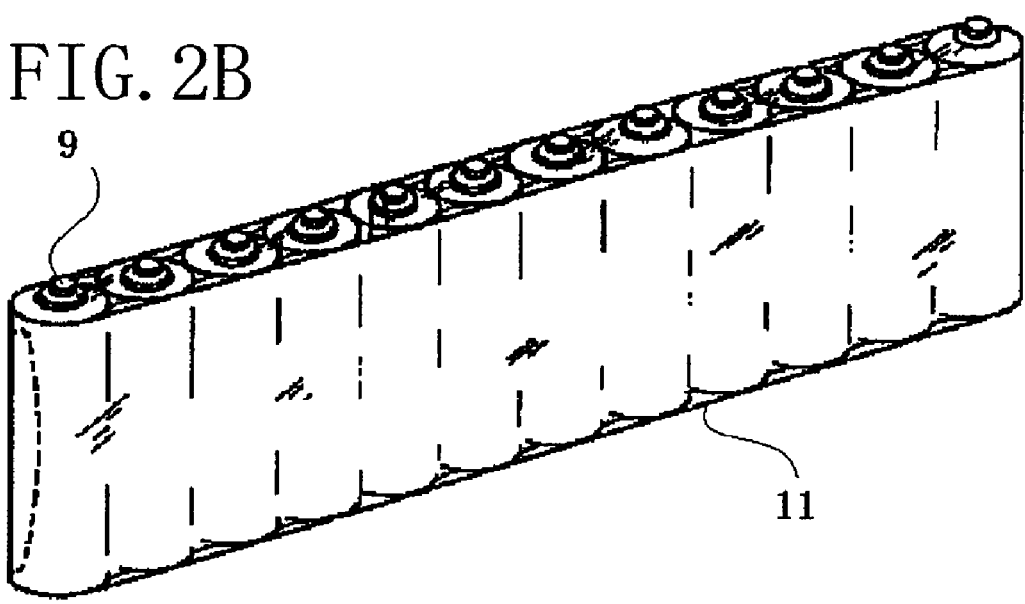

FIGS. 1A and 1B are schematic views illustrating a configuration of an AA alkaline dry battery (LR6) according to an embodiment of the present invention. FIG. 1A is a half sectional view illustrating a configuration of the alkaline dry battery and FIG. 1B is an enlarged cross-sectional view of a battery sealing portion of the alkaline dry battery. FIGS. 2A and 2B are views illustrating configurations of battery packs according to this embodiment of the present invention. FIG. 2A is a view illustrating a configuration of a battery pack in which 8 alkaline batteries are shrink-packaged. FIG. 2B is a view illustrating a configuration of a battery pack in which 12 alkaline batteries are shrink-packaged.

As shown in FIG. 1A, in an alkaline dry battery 9, an opening portion of a positive electrode case 1 having a cylindrical shape with a bottom is sealed by a terminal plate 7 serving as a negative electrode terminal via an insulating sealing body 5. As shown in FIG. 1B, a sealant layer 10 is provided between the positive electrode case 1 and the sealing body 5, thereby ensuring the sealing property between the positive electrode case 1 and the sealing body 5.

A positive electrode mixture 2 having a hollow cylindrical shape is housed in the positive electrode case 1 and a gelled negative electrode 3 is disposed in a hollow portion of the positive electrode mixture 2 with a separator 4 interposed therebetween. An opening portion of the positive electrode case 1 is sealed in a manner in which after powder generation elements such as the positive electrode mixture 2 and the gelled negative electrode 3 are housed in the positive electrode case 1, the sealing body 5 united with the terminal plate 7 electrically connected with a negative electrode current collector 6 is disposed at the opening portion of the positive electrode case 1 and then the opening portion of the positive electrode case 1 is inwardly bent to seal the opening portion. Moreover, an outer surface of the positive electrode case 1 is covered by an exterior label 8 for reliably providing insulation.

The positive electrode case 1 is not limited to a united body of a battery case and a positive electrode terminal but may be, for example, a battery case to which a positive electrode terminal is joined by welding or the like.

Characteristics of the sealant layer 10 are, in general, evaluated by a tensile shear strength test method defined by JIS/K6850. The present inventors conducted examinations on various sealant layers 10 using the test method and found that even amongst sealant layers 10 having a high adhesive strength, when drop tests were performed to battery packs in which batteries were shrink-packaged in the manner shown in FIGS. 2A and 2B, leakage occurred in some of the batteries.

Then, whether leakage occurs due to a deformation of a sealing portion of an alkaline dry battery was examined using sealant layers having different strength characteristics. As a result of the examination, the present inventors found that it is preferable that a sealant layer has a predetermined tensile strength with respect to an excess distortion which is about 10 times as larger as a distortion (typically about 0.5 mm) resulting from an actual impact.

Specifically, a high impact proof property can be maintained without causing leakage by using, as a sealant layer, a material having a tensile strength of 0.02 N/mm$^2$ or larger with respect to a tensile distortion of 5 mm, and more preferably, a material having a tensile strength of 0.02 N/mm$^2$ or larger with respect to a tensile distortion of 10 mm.

In a known tensile strength test, the tensile strength is quasi-statically measured and therefore, in the case of an instantaneous deformation due to a strong impact, it is not proper to evaluate the tensile strength using distortion amounts that are actually assumed. According to the present invention, the tensile strength is evaluated with respect to a distortion which is about 10 times as larger as a distortion resulting from an actual impact and, in this point, the present invention is technically significant.

The tensile strength of a sealant layer with respect to such a distortion amount can be measured, for example, by a method of FIGS. 3A and 3B.

First, as shown in FIG. 3A, 6 mg (by weight, excluding solvent) of a material of the sealant layer 10 is applied to a circular region (a region A) of a first sheet (for example, a sheet of the same material as a material of the positive electrode case) 12 having a diameter of 10 mm. Thereafter, as shown in FIG. 3B, a second sheet 13 is bonded onto the first sheet 12 and is pulled in the direction of an arrow X. Then, the tensile distortion (a moving distance) and the shear tensile strength are measured. By increasing an area of the part to which the sealant layer 10 is applied, the tensile strength with respect to a tensile distortion of 5 mm or larger can be measured.

More specifically, the tensile distortion and the shear tensile strength of a sealant layer can be measured by the following steps.

First, a nickel plated steel sheet 12 and a nylon sheet 13 each having a size of 20 mm×60 mm are prepared. For example, as the nickel plated steel sheet 12, a nickel plated sheet having a plating thickness of 3 μm on each side and a thickness of 0.4 mm is used. As the nylon sheet 13, a 6,6-nylon sheet having a thickness of 0.7 mm is used. Surfaces of both of the nickel plated steel sheet 12 and the nylon sheet 13 are defatted by acetone in advance. The sealant layer 10 is diluted in a solvent to obtain a viscosity of about 1000 mpa·sec and then the sealant layer 10 of an amount corresponding to a dry weight of 6 mg is applied uniformly to the circular application region (region A) of the nickel plated steel sheet 12 a diameter of 10 mm and is naturally dried for 15 minutes.

Next, the nylon sheet 13 is bonded onto the nickel plated steel sheet 12. Thereafter, a load is applied by a spindle of 15 kg for 24 hours. Using a tensile compression testing machine (for example, TG-5kN, a product of NMB), the sheets bonded together by the sealant layer 10 are clutched at the end portions and pulled in the horizontal direction to a sheet surface at a moving rate of 10 mm/min and the tensile distortion (moving distance) and the shear tensile strength are measured. Measurements are continuously taken until a predetermined tensile distortion (for example, 40 mm) is reached or the shear tensile strength becomes 0.

In this embodiment, as long as the sealant layer 10 has a predetermined tensile strength with respect to a predetermined tensile distortion, a material of the sealant layer 10 is not particularly limited. For example, when a material containing polyamide resin as a major component is used, a material having an amine number in the range from 50 to 200, and preferably a material having an amine number in the range from 75 to 147 can be used.

The sealant layer 10 may be made to contain blown asphalt. By making the sealant layer 10 contain blown asphalt, the sealant layer 10 is colored dark brown to black and thus how the sealant layer 10 is applied can be easily checked. It is also preferable that a ratio by weight of blown asphalt to polyamide resin is 3/7 or smaller.

By filling, in the positive electrode case, an excess alkaline electrolyte amount beyond an amount which is not contained in a positive electrode, a negative electrode and a separator, a lifetime of an alkaline dry battery can be increased. In such a case, the occurrence of leakage due to a deformation of a sealing portion at a time of impact is concerned. However, by using the sealant layer 10 of this embodiment, even if an excess alkaline electrolyte which a positive electrode, a negative electrode and a separator are not capable of holding exists in the positive electrode case, leakage due to a deformation of a sealing portion does not occur at a time of impact.

For example, in the case of an AA alkaline dry battery, an excess alkaline electrolyte of 0.07-0.23 g exists free in a positive electrode case so as not to be contained in any one of a positive electrode, a negative electrode and a separator, so that a long life alkaline dry battery can achieved with the leakage proof property maintained.

Herein, an alkaline electrolyte "existing free" (hereafter, referred to be merely as a "floating electrolyte") means an alkaline electrolyte which is other than an alkaline electrolyte held by a positive electrode, a negative electrode and a separator, i.e., an alkaline electrolyte impregnated in a positive electrode, an alkaline electrolyte which is absorbed and held by a gelling agent or the like and constitutes a negative electrode and an alkaline electrolyte impregnated in a separator and which floats in a positive electrode case.

The amount of a floating electrolyte can be measured by the following method.

First, an alkaline dry battery of which a weight has been measured in advance is prepared. After taking off an exterior label of the alkaline dry battery, a sealing portion of an electrode case is taken apart to open the electrode case. Then, the alkaline dry battery is turned over so that the opening portion faces downward and an alkaline electrolyte is naturally dropped. The alkaline electrolyte which stays attached to the electrolyte case, the sealing body and other components after disassembling is wiped out. Then, a total weight of disassembled components is measured and a decreased weight after disassembling is obtained. In the above-described manner, an amount (weight) of a floating electrolyte can be measured.

Hereafter, a specific configuration of each component of the alkaline dry battery of FIG. 1 will be described.

The positive electrode mixture 2, the gelled negative electrode 3 and the separator 4 hold an alkaline electrolyte. As the alkaline electrolyte, for example, an aqueous solution containing 30-40 weight percent of potassium hydroxide and 1-3 weight percent of zinc oxide is used.

The positive electrode case 1 is formed, for example, by press-molding a nickel plated steel plate in a predetermined shape having predetermined dimensions. A conductive film may be formed on an inner surface of the positive electrode case 1. As the separator 4, for example, an unwoven material containing polyvinyl alcohol fiber and rayon fiber as major components is used.

As the positive electrode mixture 2, for example, a mixture of a positive electrode active material containing at least one of manganese dioxide powder and nickel oxyhydroxide powder, a conducting agent such as graphite powder or the like, and an alkaline electrolyte is used. A binder such as polyethylene powder or the like and a lubricant such as stearate may be added to the mixture.

For example, a gelling agent such as sodium polyacrylate is added to an alkaline electrolyte, thereby obtaining a gelled alkaline electrolyte, and zinc alloy powder serving as a negative electrode active material is mixed thereto and dispersed therein. The obtained gelled alkaline electrolyte is used as the gelled negative electrode 3. To improve a corrosion resistance, a metal compound such as indium, bismuth or the like, having a high hydrogen overpotential, an ester phosphate base surfactant and the like may be added to the alkaline electrolyte. Also, to suppress zinc dendrite formation, a slight amount of silicide such as silic acid, silicate or the like may be added to the alkaline electrolyte.

It is preferable that zinc alloy powder serving as a negative electrode active material preferably having an excellent corrosion resistance is used. Moreover, in consideration of environment, it is more preferable that zinc alloy powder which is free from mercury, cadmium or lead, or all of them is used. Examples of zinc alloy includes, for example, zinc alloy containing 0.005-0.1 weight percent of indium, 0.005-0.02 weight percent of bismuth and 0.001-0.005 weight percent of aluminum. Zinc alloy may contain only one of the above-described alloy components or two or more of the above-described alloy components.

In the sealing body 5, a through hole through which the negative electrode current collector 6 is pressed-in is provided in the center, an annular thin-walled portion for functioning as a safety valve is provided around the through hole, and an outer circumference end portion is continuously formed in the periphery of the annular thin-walled portion. The sealing body 5 is obtained, for example, by injection-molding 6,6-naylon or the like into a predetermined shape having predetermined dimensions.

The negative electrode current collector 6 is obtained by press-molding a wire rod of silver, copper, brass or the like into a nail shape having predetermined dimensions. To remove impurities when the negative electrode current collector 6 is processed and achieve the hiding effect, a surface of the negative electrode current collector 6 is preferably plated by tin, indium or the like.

The negative electrode terminal plate 7 is obtained, for example, by press-molding a nickel plated steel plate, a tin plated steel plate or the like into a shape having predetermined dimensions. Moreover, a plurality of gas holes for letting a pressure out when the safety valve of the sealing body 5 functions are provided in a periphery portion of the negative electrode terminal plate 7.

EXAMPLES

Hereafter, exemplary configurations and effects of the present invention will be further described referring to examples of the present invention. However, the present invention is not limited to the examples.

A battery pack in which a plurality of AA alkaline dry batteries (LR6) having the configuration of FIG. 1 were shrink-packaged was formed by the following steps (i) through (v).

(i) Formation of Positive Electrode Mixture

Electrolyte manganese dioxide powder having an average particle diameter of 35 μm and graphite powder having an average particle diameter of 15 μm were mixed at a ratio by weight of 94:6. The mixture and an alkaline electrolyte (an aqueous solution containing 35 weight percent of potassium hydroxide and 2 weight percent of zinc oxide) were mixed at a ratio by weight of 100:2 and, after sufficient agitation, the obtained mixture was compression-molded into the form of flakes. Thereafter, a positive electrode mixture in the form of flakes was pulverized into granular shape, was classified into 10-100 meshes and then was press-molded into a hollow cylindrical shape. Thus, a positive electrode mixture 2 in the form of pellet was obtained.

(ii) Preparation of Negative Electrode

A gelling agent (sodium polyacrylate powder), an alkaline electrolyte (an aqueous solution containing 35 weight percent of potassium hydroxide and 2 weight percent of zinc oxide) and zinc alloy powder were mixed at a ratio by weight of 0.8:33.6:65.6, thereby obtaining a gelled negative electrode 3. Zinc alloy powder containing 0.020 weight percent of indium, 0.010 weight percent of bismuth and 0.004 weight percent of aluminum, having an average particle diameter of 160 μm and containing particles with a particle diameter of 75 μm at 35 percent was used.

(iii) Storage of Powder Generation Element in Positive Electrode Case

Two positive electrode mixtures 2 obtained in the step (i) were inserted in a positive electrode case 1 and pressure was applied to the positive electrode mixtures 2 so that each of the positive electrode mixtures 2 was in close contact with an inner wall of the positive electrode case 1. A separator 4 having a cylindrical shape with a bottom was disposed in the center of each of the positive electrode mixtures 2 in close contact with the positive electrode case 1. As the separator 4, an unwoven material containing polyvinyl alcohol fiber and rayon fiber as major components was used. Then, an alkaline electrolyte (an aqueous solution containing 33 weight percent of potassium hydroxide and 1 weight percent of zinc oxide) was injected in a space surrounded by the separator 4. After a lapse of a predetermined time, a certain weight of the gelled negative electrode 3 obtained in the step (ii) was filled in the space surrounded by the separator 4.

(iv) Sealing and Packaging

A sealant layer 10 was applied to an end portion, having an opening, of the positive electrode case 1 accommodating a powder generation element, and was dried. Then, a united body obtained by electric-welding a negative electrode current collector 6 to a terminal plate 7 and then pressing-in the united body in a through hole located in the center of a sealing body 5 was disposed in the end portion having an opening, of the positive electrode case 1 was inwardly bended so as to have a circular arc shape, whereby the positive electrode case 1 was sealed. Lastly, an outer surface of the positive electrode case 1 was covered by an exterior label 8, thereby obtaining an AA alkaline dry battery 9.

The sealing body 5 was obtained by injection-molding 6,6-naylon into a predetermined shape having predetermined dimensions. The negative electrode terminal plate 7 was obtained by press-molding a nickel plated steel plate having a thickness of 0.4 mm into a predetermined shape having predetermined dimensions. The negative electrode current collector 6 was pressed into a nail shaped having a length of 36.0 mm and a cylinder barrel diameter of ϕ 1.40 and a surface of the negative electrode current collector 6 was plated with tin.

(v) Formation of Battery Pack

AA alkaline dry batteries obtained in the step (iv) were disposed such that twelve batteries as a unit were arranged in parallel with one another. Then, the batteries were covered by a heat-shrinkable film made of polyethylene terephthalate and having a thickness of 25 μm and were heated so that the film was shrunk, thereby obtaining battery packs (multi-packs) each including twelve alkaline dry batteries shrink-packaged.

Battery packs (of alkaline dry batteries) formed by the above-described steps were evaluated with respect to the following items.

[1] Evaluation of Shear Tensile Strength of Materials Used for a Sealant Layer

Shear tensile strengths of various materials used for a sealant layer 10, which will be described later, were measured using the method of FIG. 3.

[2] Evaluation of Leakage Proof Property of Alkaline Dry Batteries (Battery Packs)

Twenty of battery packs (multi-packs) obtained in the step (v) were prepared and the leakage proof property of the alkaline dry batteries were evaluated by dropping test.

Figure 4:
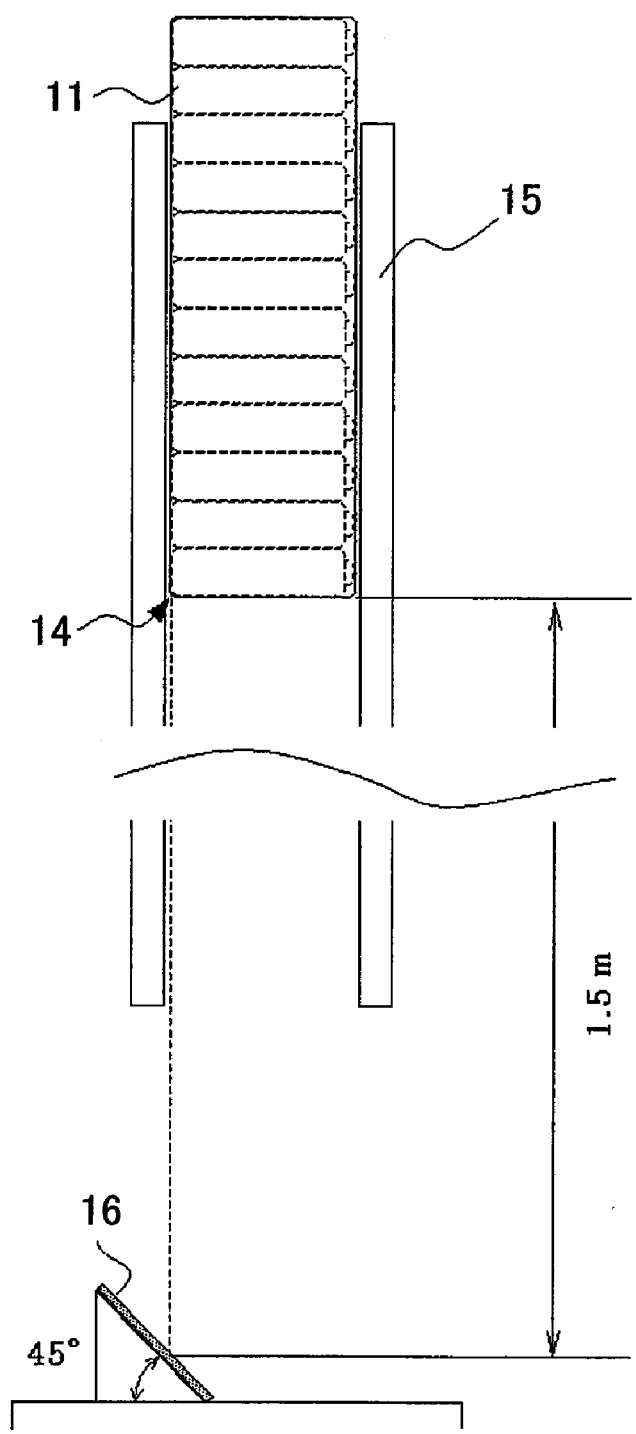
FIG. 4 is a view illustrating how a dropping test of a battery pack is performed according to an embodiment of the present invention.

Dropping test was performed, as shown in FIG. 4, in such a manner that a battery pack 11 was naturally dropped from a height of 1.5 m onto a 45 degree slope 16 on which a P tile was put, thereby giving an impact to a negative (sealing portion) side 14 of alkaline dry batteries in the battery pack 11. A guide 15 was provided to control the posture of the battery pack 11 to prevent the battery pack 11 from being inclined when the battery pack was dropped.

Each battery pack was dropped once and a leakage state thereof immediately after dropping was checked by visual observation. Thereafter, the batteries were left standing at ambient temperature and whether leakage occurred was checked by visual observation after one month and six months. Also, after the leakage state thereof immediately after dropping was checked by visual observation, a climate-temperature cycle test in temperature ranging from −20° C. to 70° C. was performed and whether leakage occurred was checked by visual observation at the fifth cycle and the tenth cycle. This test was performed by application of the methods defined by 6.2.2.4 (Test C) of JIS standard C8514 and IEC standard 60086-5.

[3] Evaluation of Discharge Characteristics of Alkaline Dry Batteries

Five of alkaline dry batteries formed in the step (iv) were prepared. For each of the batteries, pulse discharge in which discharge of a battery at 1.5 W for 2 seconds and then charge of the battery at 0.65 W for 28 seconds were performed was repeatedly performed at ambient temperature of 21±2° C. for 10 cycles per hour. Then, the total sum of cycles until a closing voltage reached 1.05 V was checked and an average value for the five batteries was calculated. This evaluation was performed by application of the discharge test method defined by IEC standard 60086-2.

Hereafter, examples of alkaline dry battery formed using various materials as the sealant layer 10 will be described.

Examples 1 and 2, Known Examples 1 and 2 and Comparative Examples 1 and 2

As materials of the sealant layer 10, the following compounds A through E were prepared. Each of the materials was diluted to a viscosity of about 1000 mPa·seconds using toluene and used as the sealant layer 10. Then, for each of the materials, 20 packs of batteries were formed.

A compound A was polyamide resin resulting from condensation reaction of triamine and dimer acid having a carbon number of 20-32. A compound B was polyamide resin resulting from condensation reaction of triamine and dimer acid having a carbon number of 36-45. A compound C was made of a material obtained by mixing blown asphalt and polybutene at a ratio of 1:1 by weight. A compound D was made of a material obtained by mixing 20% by weight of polyisobutylene, 76.8% by weight of polybutene and 3.2% by weight of polyethylene wax, i.e., polyolefin crystalline resin. A compound E was blown asphalt. A compound F was polybutene. The compound C and the compound D correspond to known materials described in Japanese Laid-Open Publication No. 2005-353308 and Japanese Laid-Open Publication No. H5-290820, respectively.

Figure 5:
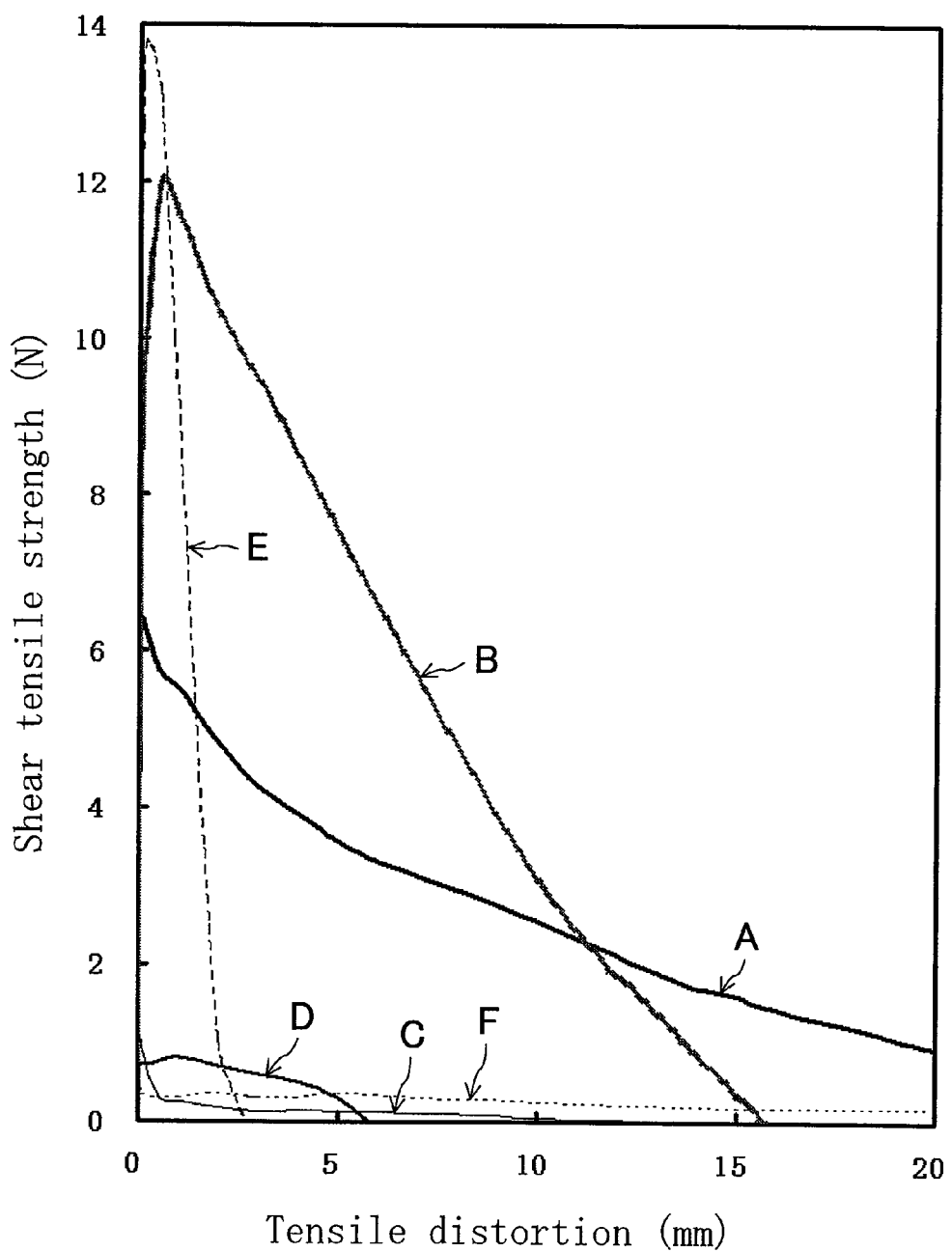
FIG. 5 is a graph showing shear tensile strength with respect to tensile distortion of sealant layers of Examples according to the present invention.

Table 1 shows evaluation results of shear tensile strength of sealant layers made of the compounds A through E and leakage proof property of alkaline dry batteries (battery packs) formed using the sealant layers. FIG. 5 is a graph in which shear tensile strengths of sealant layers made of the compounds A through F are plotted with respect to tensile distortion.

were left standing at ambient temperature after dropping test, and furthermore leakage did not occur even under a severe environment such as in climate-temperature cycle test, so it is understood that each of the sealant layers of Examples 1 and 2 had an excellent impact proof property. This is possibly because, as shown in FIG. 5, in the sealant layers (made of the compounds A and B, respectively) of the Examples 1 and 2, even with respect to an excess tensile distortion of 5 mm or more, a sufficient shear tensile strength was maintained.

In Comparative Examples 1 and 2, the occurrence of leakage was observed immediately after the batteries were dropped. This is possibly because, as shown in FIG. 5, the sealant layer (made of the compound E) of Comparative Example 1 exhibited a very high shear tensile strength but had no shear tensile strength with respect to a tensile distortion (or brittle) and the sealant layer (made of the compound F) of Comparative Example 2 was a high viscosity compound with stickiness but the shear tensile strength thereof with respect to an excess tensile distortion of 5 mm or more was insufficient.

Examples 3 through 6 and Comparative Examples 3 and 4

It is generally known that when polyamide resin is used as a sealant layer, polyamide resin has an increased viscous property with a high amine number and has a high hardness with a low amine number. Based on this fact, evaluation was performed to determine an optimal amine number for sufficient shear tensile strength with respect to an excess tensile distortion of 5 mm or more.

Diamine, triamine and tetramine were appropriately mixed to dimer acid having a carbon number of 20-32 to bring those materials into condensation reaction, thereby preparing compounds A, G, H, I, J, K and L which contain polyamide resin

TABLE 1

| | | Shear tensile strength (N) | | | Percentage of multi-packs in which leakage occurred | | | | |
|---|---|---|---|---|---|---|---|---|---|
| | | | | | Immediately after | Left standing at | | Climate-temperature cycle | |
| | | | Tensile distortion | | | ambient temperature | | | |
| | Sealant | Maximum | 5 mm | 10 mm | dropping | 1 month | 6 months | Fifth cycle | Tenth cycle |
| Example 1 | Compound A | 6.43 | 3.57 | 2.56 | 0% | 0% | 0% | 0% | 0% |
| Example 2 | Compound B | 11.98 | 7.50 | 3.06 | 0% | 0% | 0% | 0% | 0% |
| Known Example 1 | Compound C | 1.06 | 0.12 | 0.05 | 0% | 10% | 30% | 50% | 70% |
| Known Example 2 | Compound D | 0.80 | 0.30 | 0.00 | 0% | 0% | 20% | 40% | 60% |
| Comparative Example 1 | Compound E | 13.75 | 0.00 | 0.00 | 20% | 30% | 60% | 80% | 90% |
| Comparative Example 2 | Compound F | 0.39 | 0.37 | 0.25 | 10% | 10% | 40% | 50% | 70% |

As shown in Table 1, in Known Examples 1 and 2, the occurrence of leakage was observed while the batteries were left standing at ambient temperature after dropping test. Moreover, under a severe environment such as a climate-temperature cycle test, the occurrence of leakage was observed in more than half battery packs (multi-packs). This is possibly because, as shown in FIG. 5, in the sealant layers (made of the compounds C and D, respectively) of Known Examples 1 and 2, the shear tensile strength is not sufficient to stand an impact from dropping when the battery packs were dropped, and furthermore a sufficient shear tensile strength can not be maintained with respect to an excess tensile distortion of 5 mm or more.

In contrast, as shown in Table 1, in Examples 1 and 2, the occurrence of leakage was not observed while the batteries as a major component with different amine numbers. In this case, the evaluation was performed on the assumption that as the mixture ratio of diamine is increased, polyamide resin having a lower amine number is obtained, and as the mixture ratio of tetramine is increased, polyamide resin having a higher amine number is obtained. These materials were diluted to a viscosity of about 1000 mPa·second using toluene, and were used as the sealant layer 10. Then, for each of the materials, 20 packs of batteries were formed.

Table 2 shows evaluation results of amine number and shear tensile strength of sealant layers made of the compounds A, G, H, I, J, K and L and leakage proof property of alkaline dry batteries (battery packs) formed using the sealant layers.

TABLE 2

| | Sealant (polyamide resin) | Amine number | Shear tensile strength (N) | | | Percentage of multi-packs in which leakage occurred | | | | |
|---|---|---|---|---|---|---|---|---|---|---|
| | | | | Tensile distortion | | Immediately after dropping | Left standing at ambient temperature | | Climate-temperature cycle | |
| | | | Maximum | 5 mm | 10 mm | | 1 month | 6 months | Fifth cycle | Tenth cycle |
| Comparative Example 3 | Compound G | 25 | 14.21 | 0.00 | 0.00 | 10% | 20% | 50% | 60% | 90% |
| Example 3 | Compound H | 50 | 10.12 | 1.75 | 0.00 | 0% | 0% | 0% | 10% | 30% |
| Example 4 | Compound I | 75 | 8.21 | 2.19 | 1.61 | 0% | 0% | 0% | 0% | 0% |
| Example 1 | Compound A | 97 | 6.43 | 3.57 | 2.56 | 0% | 0% | 0% | 0% | 0% |
| Example 5 | Compound J | 147 | 5.48 | 2.98 | 1.94 | 0% | 0% | 0% | 0% | 0% |
| Example 6 | Compound K | 200 | 3.95 | 2.06 | 1.17 | 0% | 0% | 0% | 0% | 20% |
| Comparative Example 4 | Compound L | 227 | 1.59 | 1.37 | 0.86 | 0% | 0% | 20% | 20% | 40% |

As shown in Table 2, in the range of amine number in the range from 50 to 200 (Examples 3 through 6), as a result of dropping test of the battery packs (multi-packs), the occurrence of leakage was not observed while the batteries were left standing at ambient temperature after dropping test, and furthermore, in the range from 75 to 147 (Examples 1, 4 and 5), leakage did not occur even in a severe environment such as a climate-temperature cycle test This shows that a high shear tensile strength was maintained.

When the amine number was less than 50 (Comparative Example 3), a very high shear tensile strength was exhibited but could not maintain a shear tensile strength with respect to an excess tensile distortion of 5 mm or more, so the occurrence of leakage was observed immediately after the batteries were dropped. Moreover, when the amine number was over 200 (Comparative Example 4), a high viscous property was exhibited but a shear tensile strength with respect to an excess tensile distortion of 5 mm or more was insufficient. Thus, the occurrence of leakage was observed while the batteries were left standing at ambient temperature after dropping test.

From the above-described results, it is shown that when polyamide resin is used as a sealant layer, as long as the amine number is in the range from 50 to 200, more preferably in the range from 75 to 147, a high impact proof property can be achieved without causing leakage even though a sealing portion is deformed due to a strong impact.

Focusing on the impact proof property, a material of which a tensile strength is 0.02 N/mm² (1.75 N/5×5×3.14 mm²) or more with respect to a tensile distortion of 5 mm is used as a sealant layer, thereby achieving a high impact proof property without causing leakage while the batteries were left standing at ambient temperature after dropping test. Furthermore, a material of which a tensile strength is 0.02 N/mm² (1.61 N/5×5×3.14 mm²) or more with respect to a tensile distortion of 10 mm is used as a sealant layer, thereby achieving a high impact proof property without causing leakage even in a severe environment such as a climate-temperature cycle test.

Examples 7 through 15

When blown asphalt is added to polyamide resin, the sealant layer is colored dark brown to black. Thus, how the sealant layer is applied to the positive electrode case can be easily checked and the sealant layer can be advantageously fabricated at low costs. The present inventors, thus, evaluated influences on the leakage proof property when blown asphalt was added to polyamide resin.

Compounds having different mixture ratio of blown asphalt were prepared for each of the compounds A, I and J. Using the prepared compounds as the sealant layer 10, 20 packs of batteries were formed for each of the compounds.

Table 3 shows evaluation results of shear tensile strength of sealant layers made of the compounds and leakage proof property of alkaline dry batteries (battery packs) formed using the sealant layers.

TABLE 3

| | Sealant (mixture ratio with blown asphalt) | Shear tensile strength (N) | | | Percentage of multi-packs in which leakage occurred | | |
|---|---|---|---|---|---|---|---|
| | | | Tensile distortion | | Immediately after dropping | Left standing at ambient temperature | |
| | | Maximum | 5 mm | 10 mm | | 1 month | 6 months |
| Example 4 | Compound I | 8.21 | 2.19 | 1.61 | 0% | 0% | 0% |
| Example 7 | Compound I:Compound E = 9:1 | 8.55 | 1.96 | 1.40 | 0% | 0% | 0% |
| Example 8 | Compound I:Compound E = 8:2 | 8.81 | 1.77 | 1.09 | 0% | 0% | 0% |
| Example 9 | Compound I:Compound E = 7:3 | 9.12 | 1.50 | 0.75 | 0% | 0% | 0% |
| Example 1 | Compound A | 6.43 | 3.57 | 2.56 | 0% | 0% | 0% |
| Example 10 | Compound A:Compound E = 9:1 | 6.80 | 3.46 | 2.27 | 0% | 0% | 0% |
| Example 11 | Compound A:Compound E = 8:2 | 7.21 | 3.20 | 1.99 | 0% | 0% | 0% |
| Example 12 | Compound A:Compound E = 7:3 | 7.72 | 2.98 | 1.50 | 0% | 0% | 0% |
| Example 5 | Compound J | 5.48 | 2.98 | 1.94 | 0% | 0% | 0% |
| Example 13 | Compound J:Compound E = 9:1 | 5.85 | 2.81 | 1.80 | 0% | 0% | 0% |

TABLE 3-continued

| | Sealant (mixture ratio with blown asphalt) | Shear tensile strength (N) | | | Percentage of multi-packs in which leakage occurred | | |
|---|---|---|---|---|---|---|---|
| | | | Tensile distortion | | Immediately after | Left standing at ambient temperature | |
| | | Maximum | 5 mm | 10 mm | dropping | 1 month | 6 months |
| Example 14 | Compound J:Compound E = 8:2 | 6.66 | 2.65 | 1.66 | 0% | 0% | 0% |
| Example 15 | Compound J:Compound E = 7:3 | 7.51 | 2.45 | 1.43 | 0% | 0% | 0% |

As shown in Table 3, in the case where the ratio by weight of blown asphalt to polyamide resin was 3/7 or less, the occurrence of leakage was not observed while the batteries were left standing at ambient temperature after dropping test. This shows that good leakage proof property was maintained.

However, if the ratio by weight of blown asphalt to polyamide resin is over 3/7 (not shown), the shear tensile strength with respect to an excess tensile distortion of 5 mm or more is reduced. Accordingly, a leakage possibly occurs when the batteries are left standing at ambient temperature after dropping test and thus it is not preferable to mix blown asphalt and polyamide resin at a smaller ratio by weight than 3/7.

Examples 16 through 48

By accommodating, in the positive electrode case, an excess alkaline electrolyte amount beyond an amount which the positive electrode, the negative electrode and the separator are capable of holding, a lifetime of an alkaline dry battery can be increased. In such a case, a leakage due to deformation of the sealing portion at an impact is concerned. Therefore, the present inventor conducted examination of the relationship between the amount of free electrolyte and leakage proof property in each of alkaline batteries formed using various sealant layers.

Table 4 shows evaluation results of discharge characteristics and leakage proof properties of alkaline dry batteries (battery packs) formed using different sealant layers for each case of free electrolytes of 0.07 g, 0.18 g and 0.23 g.

TABLE 4

| | Floating electrolyte (g) | Sealant | Discharge characteristics (cycle) | Percentage of multi-packs in which leakage occurred | | |
|---|---|---|---|---|---|---|
| | | | | Immediately after dropping | Left standing at ambient temperature | |
| | | | | | 1 month | 6 months |
| Comparative Example 1 | 0 | Compound C | 110 | 0% | 10% | 30% |
| Comparative Example 2 | | Compound D | | 0% | 0% | 20% |
| Example 16 | 0.07 | Compound B | 121 | 0% | 0% | 0% |
| Example 17 | | Compound H | | 0% | 0% | 0% |
| Example 18 | | Compound I | | 0% | 0% | 0% |
| Example 19 | | Compound I:Compound E = 7:3 | | 0% | 0% | 0% |
| Example 20 | | Compound A | | 0% | 0% | 0% |
| Example 21 | | Compound A:Compound E = 9:1 | | 0% | 0% | 0% |
| Example 22 | | Compound A:Compound E = 8:2 | | 0% | 0% | 0% |
| Example 23 | | Compound A:Compound E = 7:3 | | 0% | 0% | 0% |
| Example 24 | | Compound J | | 0% | 0% | 0% |
| Example 25 | | Compound J:Compound E = 7:3 | | 0% | 0% | 0% |
| Example 26 | | Compound K | | 0% | 0% | 0% |
| Comparative Example 5 | | Compound C | | 10% | 50% | 80% |
| Comparative Example 6 | | Compound D | | 0% | 30% | 80% |
| Example 27 | 0.18 | Compound B | 133 | 0% | 0% | 0% |
| Example 28 | | Compound H | | 0% | 0% | 0% |
| Example 29 | | Compound I | | 0% | 0% | 0% |
| Example 30 | | Compound I:Compound E = 7:3 | | 0% | 0% | 0% |
| Example 31 | | Compound A | | 0% | 0% | 0% |
| Example 32 | | Compound A:Compound E = 9:1 | | 0% | 0% | 0% |
| Example 33 | | Compound A:Compound E = 8:2 | | 0% | 0% | 0% |
| Example 34 | | Compound A:Compound E = 7:3 | | 0% | 0% | 0% |
| Example 35 | | Compound J | | 0% | 0% | 0% |
| Example 36 | | Compound J:Compound E = 7:3 | | 0% | 0% | 0% |
| Example 37 | | Compound K | | 0% | 0% | 0% |
| Comparative Example 7 | | Compound C | | 20% | 90% | 100% |
| Comparative Example 8 | | Compound D | | 10% | 100% | 100% |
| Example 38 | 0.23 | Compound B | 140 | 0% | 0% | 0% |
| Example 39 | | Compound H | | 0% | 0% | 0% |

TABLE 4-continued

| | Floating electrolyte (g) | Sealant | Discharge characteristics (cycle) | Percentage of multi-packs in which leakage occurred | | |
|---|---|---|---|---|---|---|
| | | | | Immediately after dropping | Left standing at ambient temperature | |
| | | | | | 1 month | 6 months |
| Example 40 | | Compound I | | 0% | 0% | 0% |
| Example 41 | | Compound I:Compound E = 7:3 | | 0% | 0% | 0% |
| Example 42 | | Compound A | | 0% | 0% | 0% |
| Example 43 | | Compound A:Compound E = 9:1 | | 0% | 0% | 0% |
| Example 44 | | Compound A:Compound E = 8:2 | | 0% | 0% | 0% |
| Example 45 | | Compound A:Compound E = 7:3 | | 0% | 0% | 0% |
| Example 46 | | Compound J | | 0% | 0% | 0% |
| Example 47 | | Compound J:Compound E = 7:3 | | 0% | 0% | 0% |
| Example 48 | | Compound K | | 0% | 0% | 0% |
| Comparative Example 9 | | Compound C | | 40% | 100% | 100% |
| Comparative Example 10 | | Compound D | | 30% | 100% | 100% |

As shown in FIG. 4, in the alkaline dry batteries (Examples 16 through 48) each of which was formed using a sealant layer according to the present invention, the discharge characteristics (cycle number) was improved by about 10% or more, compared to the known alkaline dry batteries (Known Examples 1 and 2). Moreover, even though an excess alkaline electrolyte was contained, in all the alkaline dry batteries (Examples 16 through 48) of this embodiment, the occurrence of leakage while the batteries were left standing at ambient temperature after dropping test was not observed. In contrast, in the alkaline dry batteries (Comparative Examples 5 through 10) each of which was formed using a known sealant layer, the increase of free electrolyte and the occurrence of leakage were markedly observed.

In the case where the amount of free electrolyte was further increased to be 0.28 g (not shown), even in an alkaline dry battery which was formed using a sealant layer according to the present invention, the occurrence of leakage was observed after a lapse of six months since the battery was left standing at ambient temperature after dropping test.

This shows that when a sealant layer according to the present invention is used, an alkaline dry battery in which an impact proof property is maintained and discharge characteristics are improved can be achieved by accommodating a free electrolyte of 0.07-0.23 g in a positive electrode case (AA cell).

The present invention has been described with reference to preferred embodiments of the present invention. However, the present invention is not limited to the above-described embodiments and various modifications are possible. For example, in the above-described embodiment, as the form of package for battery packs, shrink packaging using a heat-shrinkable film has been used. However, even when a blister pack or a paper packaging box is used, the same effects as those of the present invention can be achieved. When a method in which a packaging body in which a plurality of batteries are shrink-packaged is set as a unit package body, a plurality of unit package bodies are arranged and packaged by a second heat-shrinkable film (exterior packaging film), i.e., double shrink packaging is used, as a matter of course, the present invention can be applied.

What is claimed is:

1. An alkaline dry battery in which an opening portion of a positive electrode case is sealed by a terminal plate serving as a negative electrode terminal via an insulating sealing body, the battery comprising: a sealant layer provided between the positive electrode case and the sealing body, wherein:
   the sealant layer is made of a material containing polyamide resin as a major component, and
   the polyamide resin has an amine number in a range from 50 to 200 and has a tensile strength of 0.02 N/mm$^2$ or more with respect to a tensile distortion of 5 mm.

2. The alkaline dry battery of claim 1, wherein the amine number is in a range from 75 to 147.

3. The alkaline dry battery of claim 1, wherein the sealant layer contains blown asphalt.

4. The alkaline dry battery of claim 3, wherein a ratio by weight of the blown asphalt to the polyamide resin is 3/7 or less.

5. The alkaline dry battery of claim 1, wherein the sealant layer is made of a material having a tensile strength of 0.02 N/mm$^2$ or more with respect to a tensile distortion of 10 mm.

6. The alkaline dry battery of claim 1, wherein an excess alkaline electrolyte which is not contained in a positive electrode, a negative electrode and a separator exists in the positive electrode case.

7. The alkaline dry battery of claim 6, wherein the positive electrode case is made of a case for an AA alkaline dry battery, and
   an excess alkaline electrolyte of 0.07-0.23 g exists in the positive electrode case.

8. A battery pack comprising a plurality of alkaline dry batteries of claim 1 which are shrink-packaged by a heat-shrinkable film, a blister pack or a paper pack.

* * * * *